United States Patent Office

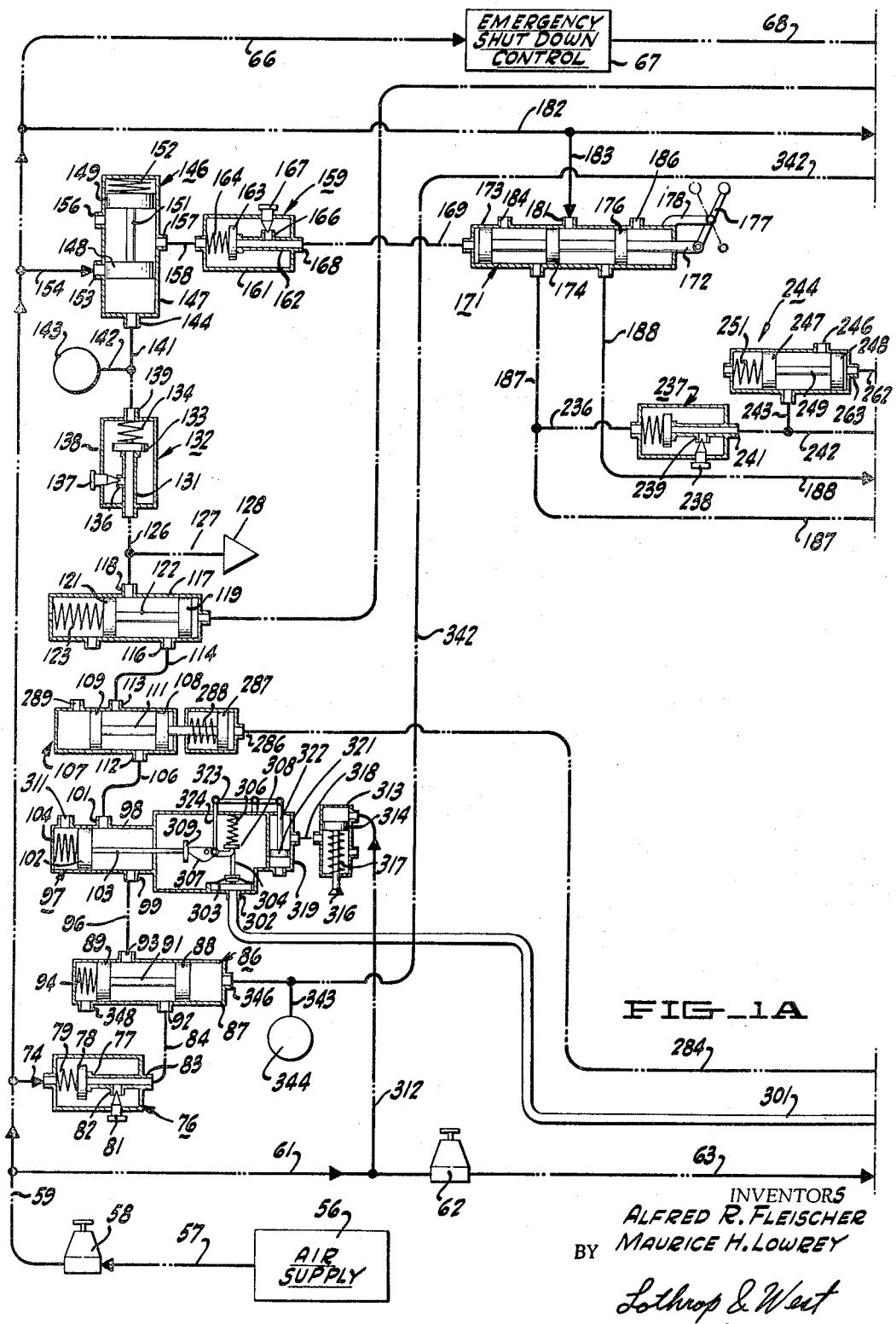

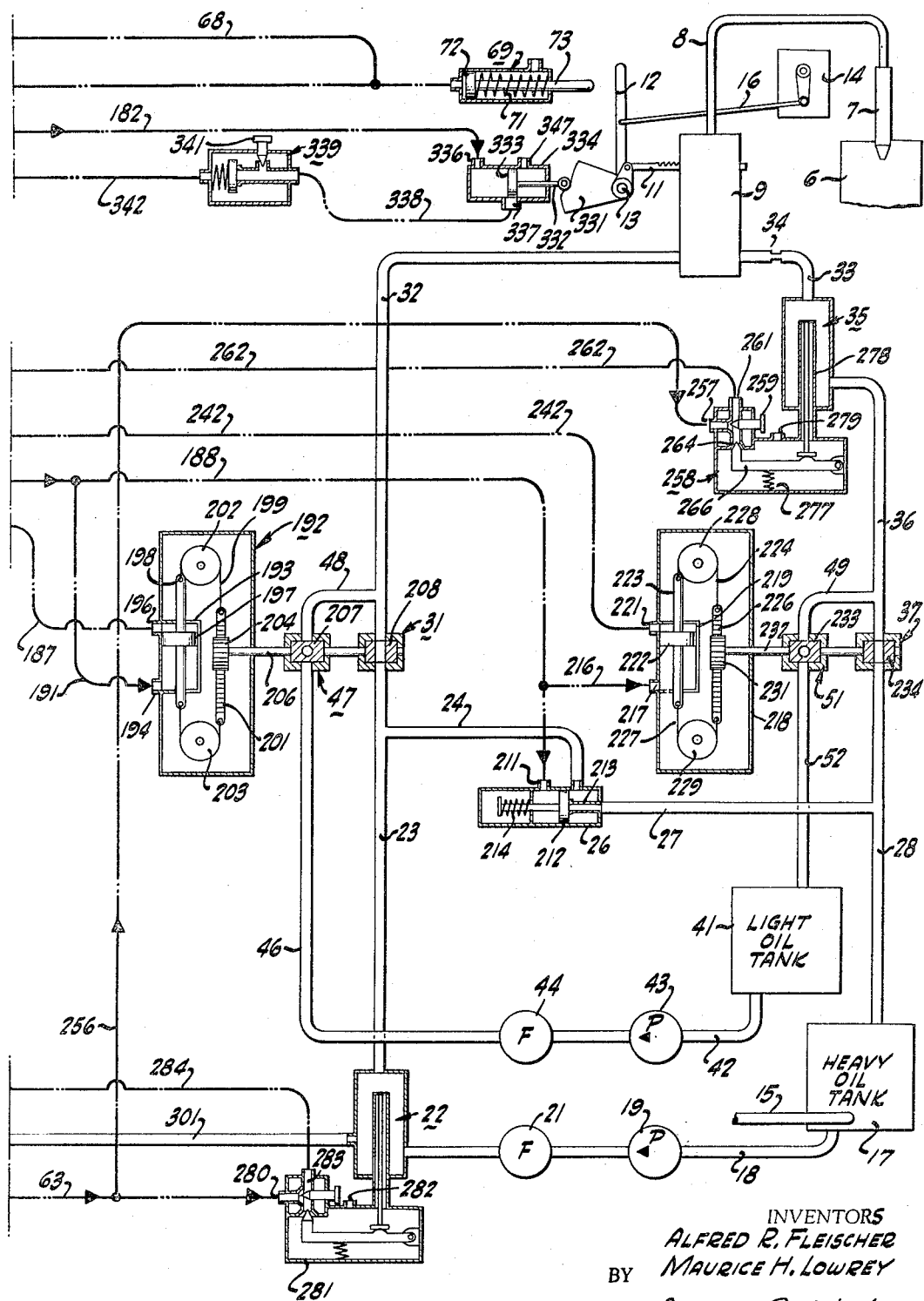
FIG_1B

3,310,097
Patented Mar. 21, 1967

3,310,097
FUEL CONTROL SYSTEM
Alfred R. Fleischer, Pleasant Hill, and Maurice H. Lowrey, Pleasanton, Calif., assignors to General Metals Corporation, Oakland, Calif., a corporation of California
Filed Mar. 23, 1965, Ser. No. 442,046
6 Claims. (Cl. 158—36)

Our invention relates primarily to fuel supply mechanisms for internal combustion engines and particularly is concerned with the supply and control of two separate fuels especially for use in connection with an injection-type, heavy duty engine. In many so-called diesel or compression ignition injection engines, a relatively expensive light fuel is utilized for starting the operation, whereas the major portion of the running, particularly under heavy loads, is accomplished on a much cheaper and heavier fuel. The light fuel flows readily at all ordinary temperatures and can be handled without particular or special treatment, whereas the heavy fuel oil is usually of such high viscosity that it will not flow in small pipes at all and in fact may even be semi-solid at ordinary temperatures. The heavy fuel must necessarily be heated and rendered considerably less viscous in order to be transported through conduits and handled in the customary manner of handling the light fuel. Much of the same mechanism is desirably used for both fuels. A difficulty sometimes arises after operation on heavy fuel in making sure that all of the handling mechanism, including the conduits or fuel lines, is well purged of the heavy fuel before a drop in temperature or before shut-down. Otherwise, the lines cool with the heavy fuel in them and must either be completely reheated or the heavy fuel must otherwise be dislodged before resumption of operation can take place. Also, there are certain emergency conditions which are close to shut-down conditions which require operation on something other than the heavy fuel. Also, under some conditions of operation, particularly very light load operation, the heavy fuel supply is not suitable either because of loss of flexibility in the engine or because the fuel flow rate is so low as to inhibit proper maintenance of fuel temperature and viscosity.

It is therefore an object of our invention to provide a fuel control system which permits an engine operator to shift back and forth at will between heavy fuel and light fuel.

Another object of the invention is to provide a system for operating an engine on either light fuel or heavy fuel except under emergency conditions. Under such emergency conditions, the engine is automatically operated on light fuel.

A further object of the invention is to provide for means for shifting the engine over to operation on light fuel just prior to shut-down.

Another object of the invention is to make sure that the temperature and corresponding viscosity of the heavy fuel are appropriate before the engine is permitted to operate upon the heavy fuel.

A further object of the invention is to provide a fuel system which ensures that the engine, when operating under relatively light load, operates on only light fuel.

Another object of the invention is to provide a generally improved fuel control system.

Other objects, together with the foregoing, are attained in the embodiment of the invention described in the accompanying description and illustrated in the accompanying drawings, in which:

FIGURES 1A and 1B when placed side by side with FIGURE 1A on the left show a diagrammatic layout of a complete fuel control system pursuant to our invention.

While the invention can be embodied in a number of different ways, depending somewhat upon the type of engine to which it is applied and other environmental conditions, it has successfully been embodied as set forth herein. In this instance, the engine 6, diagrammatically illustrated, is a reciprocating internal combustion engine having a number of cylinders, each of which is provided with a fuel injector 7 supplied with fuel through a line 8 by means of an injection pump 9 of the customary sort. The output of the injection pump is variable by a rack structure 11 operated by a hand lever 12 functioning through a control shaft 13, so that by varying the position of the lever, the attendant can vary the amount of fuel which is supplied to the engine. There is also a governor 14 of the usual sort having a linkage 16 to the hand lever 12 so that in the absence of an attendant the governor will maintain the lever 12 in an appropriate position for supplying the desired amount of fuel to the injector nozzles 7. The arrangement is such that the lever 12 is illustrated approximately in its mid-position, a shift to the left in FIGURE 1B increasing the amount of fuel and a shift to the right in that figure decreasing the amount of fuel.

As the arrangement is illustrated in the figures, the conditions are shown consistent with operation of the engine at a steady mid-load with fuel being supplied from a heavy oil tank 17. A thermal heater 15 is indicated since the heavy fuel is so viscous at ordinary temperatures that it cannot readily flow. The oil heating means reduces the viscosity of the heavy oil by raising the heavy oil temperature so that the heavy oil can flow readily in the fuel handling lines. In any case, fuel from the heavy oil tank 17 is withdrawn through a duct 18 by a pump 19 and is discharged through a filter 21 into a thermal sensing device 22. Assuming that the temperature of the heavy fuel is appropriately high, the thermal sensing device 22 is not adversely affected and the heavy fuel continues through a conduit 23. A branch conduit 24 leading through a bypass valve 26 extends to a junction conduct 27 merging with a return pipe 28 terminating in the heavy oil tank 17. If desired, there can be a local recirculation of the heavy oil from the tank through a portion of the piping and back to the tank. This short circuiting is sometimes advisable in the initial warming of the heavy oil and provides for warming of the lines prior to steady operation on heavy oil.

The conduit 23 extends through a heavy oil supply valve 31 into a conduit 32 leading to the injection pump 9. As much of the oil as is necessary for injection is removed by the injection pump. Any surplus is returned through a duct 33 having a restricting orifice 34 therein to maintain appropriate pressure on the injection pump, and then flows through a temperature sensing device 35. If the temperature of the returning oil does not affect the sensing device 35, the returned heavy oil continues through a pipe 36 to a return heavy oil valve 37 and then flows through the duct 28 back to the heavy oil tank 17. The circuit condition described is that which is normal for continued, steady operation of the engine 6 with heated, heavy oil.

During starting, when running at light load, under emergency conditions and also just before shut-down, it is deemed advisable to operate the engine on a light fuel oil. This fuel oil requires no heating under any normal operating conditions and is effective to purge the lines of any residue of heavy oil, although it is desired not to admix the heavy oil and the light oil any more than is necessary. A light oil tank 41 is provided and discharges through a pipe 42 into a pump 43, from which flow occurs through a filter 44 into a line 46 extending to a light oil supply valve 47. As shown in FIGURE 1B, this valve is closed, but when the valve 47 is open, light oil can flow through a junction pipe 48 into the pipe 32 and can then complete the circuit through the injection pump and into the pipe 36. Just ahead of the return heavy oil valve 37, a branch pipe 49 diverges from the pipe 36 and leads to a light oil return valve 51 which is in closed position in FIGURE 1B, but which when open permits further flow of the light fuel oil through a return pipe 52 to the light oil tank 41.

Since in accordance with the invention various devices are provided for switching back and forth between the heavy oil supply and the light oil supply and since many of these devices are not only operated automatically but are made responsive to relatively small controlling forces, there is provided a servo system operated by compressed air.

As particularly illustrated in FIGURE 1A, a reservoir 56 of air under superatmospheric pressure is maintained by any suitable means, such as the customary air compressor. From the reservoir 56 a line 57 leads through a pressure regulator 58 for maintaining pressure in a line 59 on the downstream side of the regulator at a fixed value; for example, sixty pounds p.s.i. The line 59 in effect is a manifold from which various offtakes extend to different control instrumentalities. One of these is a line 61 provided with a pressure regulator 62 for reducing the air pressure to a lower value; for example, twenty-five pounds p.s.i., which is made available in a line 63 for the operation of certain of the devices, particularly the thermally responsive mechanism 22 and the thermally responsive mechanism 35.

Since it is desired to provide against certain emergency contingencies such as absence of cooling water in the jackets for the engine 6 or excessive cooling water temperature or absence of lubricating oil and the like, the manifold 59 at one end is connected to a conduit 66 joined to an emergency shut-down control 67. This control is not illustrated in detail, but is a standard mechanism responsive to the various contingencies mentioned and any others which may be provided for. Normally, the emergency shut-down control 67 serves as a block to any further transmission of pressure air from the conduit 66, but upon the occurrence of any of the mentioned contingencies, the control 67 immediately opens and pressure air from the conduit 66 travels through the control 67 into a conduit 68 leading to a shut-down cylinder 69.

In the cylinder, a spring 71 urges a piston 72 toward one extreme end of its stroke and holds a plunger 73 in retracted position out of the path of the control lever 12. When pressure air is passed into the cylinder 69, the piston 72 translates to the right in FIGURE 1B, compressing the spring 71 and expelling the plunger 73. This physically contacts the control lever 12 and rotates such lever clockwise in FIGURE 1B to its minimum operating or stop position, thus operating the rack 11 to overcome the effect of the speed governor 14 and to shut down the injector pump 9. The engine is thus shut down or reduced to low speed.

Certain other control operations can also take place. To consider these, it is helpful to follow the flow of pressure air from the air conduit 59 through a duct 74 leading to a restrictor valve 76. This is shown as a standard, commercial valve unit having a central air tube 77 sealed by a disk valve 78 under urgency of a spring 79. It is primarily useful in this instances because of a needle valve 81 controlling flow into an orifice tube 82 communicating with an outlet 83 from the valve 76. In the event of any unusual backflow or in the event of reverse purging of the system, the valve disk 78 can unseat, but under normal conditions of operation with forward flow, the valve disk 78 remains seated and the valve 76 serves merely as a restrictor. The position of the needle valve 81 is varied to regulate the amount of air that can meter through the valve 76 to the outlet 83.

Connected to the outlet is a duct 84 leading to a control valve 86. This is a cylindrical casing 87 having a pair of pistons 88 and 89 therein connected by a stem 91 and designed to override certain port tubes 92 and 93. The stem 91 is urged toward the right in FIGURE 1A by a coil spring 94. In the position shown, air leaving the manifold 59 through the restrictor valve 76 passes freely from the inlet tube 92 to the outlet tube 93 between the pistons 88 and 89. This flow continues through a connector 96 to a special control valve 97, part of which includes a cylindrical casing 98 having an inlet tube 99 and an outlet tube 101. There is a piston 102 within the cylinder joined at one side to a stem 103 and urged toward the right in FIGURE 1A by a coil spring 104. In the position shown, flow from the connector 96 is through the casing 98 from the inlet tube 99 to the outlet tube 101 and thence through a duct 106 into a valve 107. The casing of this valve is circular cylindrical and contains a pair of pistons 108 and 109 joined by a stem 111. The casing is provided with an inlet 112 and an outlet 13. In the position of the parts as shown, flow continues from the duct 106 through the inlet port 112 and through the casing 107 and out the outlet port 113 into a pipe 114.

The pipe 114 is connected to an inlet 116 of a circular cylindrical casing 117 having an outlet 118 occupied by a pair of pistons 119 and 121 joined by a stem 122 urged toward the right in FIGURE 1A by a coil spring 123. In the position of the parts as shown, flow is into the inlet 116, through the casing 117 and out the outlet 118 into a conduit 126. A branch 127 from the conduit 126 leads to a pressure switch 128. While the circuit is not shown in FIGURE 1A, the switch 128 is electrically connected to the customary motor driving the fuel pump 43 for the light oil. Whenever there is pressure on the switch 128 from the pipe 126 and the connecting pipe 127, the switch is open and the light fuel oil pump 43 is not operated. Since the engine 6 ordinarily runs for protracted periods on heavy oil, there is no point in idly running the light fuel pump and so whenever there is pressure on the switch 128 the light fuel pump does not run. However, should there be a low pressure or no pressure on the switch 128, then the light fuel pump 43 is immediately operated.

The pipe 126 extends into the inlet tube 131 of a control valve 132 substantially duplicating the valve 76 and having not only a valve disk 133 for freely permitting upward flow through the tube 131 as regulated by a coil spring 134, but also having a side port 136, flow through which is controlled by a needle valve 137 screwed in the valve casing 138. By appropriately adjusting the needle valve 137, the rate of return flow of pressure air to the inlet pipe 126 through the casing 138 from the outlet 139 can be regulated. Air discharging at normal pressures from the outlet 139 is carried into a duct 141. A branch pipe 142 joined to the conduit 141 extends to an accumulator 143 of predetermined volume. The desired volumetric capacity between the outlet 139 and the inlet 144 of a main control valve 146 is thus established.

The valve 146 is inclusive of a circular cylindrical casing 147 having a pair of pistons 148 and 149 therein joined by a stem 151 and impelled downwardly in FIGURE 1A by a coil spring 152. The casing 147 has a port 153 connected by a pipe 154 to the manifold 59. Also, the casing 147 has an atmospheric discharge port 156 as well as a connecting port 157 joined by a pipe 158 to a flow control valve 159. In the position of the control valve 146 shown in FIGURE 1A, the piston 148 blocks the port 153 so pressure fluid from the pipe 154 cannot enter the casing 147 but the port 156 to the atmosphere is in free communication through the casing with the pipe 158. The flow control valve 159 is like the valve 132 and the valve 76 and includes not only a casing 161 but an outlet tube 162 sealed in one direction by a valve disk 163 impelled into position by a coil spring 164. A side port 166 is under control of a variable needle valve 167. By appropriately adjusting the needle valve, the rate of flow through the control valve 159 is regulated. The outlet 168 from the valve 159 is through a pipe 169 to a switch valve 171. This valve is provided with a central stem 172 carrying three pistons 173, 174 and 176. The stem 172 is reciprocated by a hand or manual lever 177 pivoted on a bracket 178. In the full line position shown in FIGURE 1A, the lever 177 is in the heavy oil operating position, but when the lever 177 is rotated in a counterclockwise direction in FIGURE 1A into the dotted line position therein, the valve is in the light oil operating position.

The casing of the valve 171 centrally is provided with an inlet port 181 supplied with air under pressure from the manifold 59 through a conduit 182 having a branch 183 extending to the port 181. The casing also has atmospheric vent ports 184 and 186. Furthermore, from the valve 171 there extend a light oil control line 187 and a heavy oil control line 188. In the position of the valve 171 shown in FIGURE 1A, the light oil control line 187 is vented to the atmosphere through the port 184, while the pressure line 183 is connected through the casing to the heavy oil control line 188. When the lever 177 is reversed in position, then the light oil control line 187 is connected to the air pressure line 183, while the heavy oil control line 188 is vented to the atmosphere through the port 186.

In the heavy oil operating position shown, the line 188, being under air pressure, supplies such pressure through a branch conduit 191 into an oil supply selector 192. This selector includes a casing having a cylinder 193 therein provided with a port 194 to which the line 191 is connected and also provided with another port 196 to which the light oil control line 187 is connected. Within the cylinder 193, a piston 197 reciprocates. The piston is on a rod 198 joined by a cable 199 to a rack 201, the cable being trained around rotatable pulleys 202 and 203. Meshing with the rack 201 is a gear 204 on a rotatable shaft 206 carrying the cores 207 and 208 of the valves 47 and 31, respectively. The valve cores 207 and 208 are ninety degrees apart on the shaft 206, so that when one of the valves is open, the other one is closed. In the position shown, with air pressure beneath the piston 197 because of the connection of the heavy oil air line branch 191 to the port 194, the parts are in the heavy oil circulating position with the light oil valve core 207 closed. Since there are no flow limiting valves in either of the air lines 187 and 188, switching of the lever 177, for example, between the heavy oil and light oil positions causes a substantially immediate shifting of the piston 197 and a substantially immediate changing of the flow path through the valves 47 and 31. Thus the supply of fuel can be quickly switched between heavy oil and light oil.

The heavy oil air line 188 continues, as seen in FIGURE 1B, to an inlet port 211 in the heavy oil bypass 26. Since there is assumed to be pressure in the line 188, this pressure is communicated to the valve 26 and therein forces a piston 212 to the right to seat on the outlet tube 213 and tensioning a restoring spring 214. Thus, when the heavy oil valve core 208 is in supply position, the bypass conduit 24 is blocked by the seating of the valve piston 212. There is no shunt path through the return line 27 to the heavy oil tank, and all of the heavy oil must be discharged into the pipe 32. Whenever there is no pressure at the inlet orifice 211, the spring 214 becomes effective to translate the valve piston 212, uncovering the outlet 213 and permitting shunt flow through the pipes 24 and 27.

The line 188 has a branch 216 connected to a port 217 in a return oil selector housing 218. Therein is disposed a cylinder 219 having another port 221 on the opposite side of a piston 222. This is reciprocable within the cylinder 219 with a piston rod 223 at one end connected by a cable 224 to a rack 226 and at the other end connected by a cable 227 to the other end of the rack 226. Pulleys 228 and 229 guide the cable between the piston rod 223 and the rack 226. Meshing with the rack is a pinion 231 on a shaft 232 carrying a light oil return valve core 233 and a heavy oil return valve core 234. The cores 233 and 234 are disposed within the valves 51 and 37 at right angles to each other, so that when one valve is open, the other one is shut. Both valves are responsive to the position of the piston 222 within the cylinder 219.

When there is air pressure in the line 188, as shown in FIGURE 1B, the piston 222 is at its uppermost position and the valves are arranged so that the light oil valve 51 is blocked, whereas the heavy oil return valve 37 is open. When the lever 177 is shifted to its opposite position and the line 188 is vented to the atmosphere and pressure is supplied to the line 187, then there is air flow from the line 187 into a branch line 236 extending to the inlet of a flow control valve 237. This is like the valve 159, for example, and is primarily utilized to control the rate of air flow therethrough toward the right. A needle valve 238 regulates air flow through an orifice 239 leading to the outlet 241. Connected to the outlet is a pipe 242 extending to the port 221 of the oil return selector.

Even though pressure air may flow at a regulated rate from the outlet 241, that pressure air does not necessarily get to the port 221. This is because a branch pipe 243 leads into a valve 244 having an outlet 246 to the atmosphere. Within the valve casing are pistons 247 and 248 joined by a rod 249 and urged toward the right in FIGURE 1A by a spring 251. In the position of the valve 244 as shown, the outflow capacity is greater than the flow through the outlet 241 of the valve 237. Under these circumstances, no air pressure can build up in the line 242 to reverse the return selector valves. The reason for this arrangement is that when at any time the lever 177 is shifted from heavy oil position to light oil position, it is perfectly satisfactory to shift immediately to light oil on the intake side of the injection pump 9. But it is not satisfactory immediately to shift on the return side of the injection pump. There is still heavy oil in the return conduits. It is desired not to direct this returning heavy oil into the light oil tank, as would occur if the return oil selector were immediately reversed.

In accordance with the invention, we provide means for sensing when the surplus oil discharged from the injection pump 9 after a change from heavy oil to light oil operation is again in fact light oil and that the heavy oil has been to that extent purged from the return lines. For that reason, the temperature responsive device 35 is utilized. Since the heavy oil must necessarily be heated in order to flow, its temperature is a great deal higher than the normal temperature of the light oil, which does not require any preheating. Consequently, the sensing device 35 detects when the temperature is high and thus when heavy oil is present or when the temperature is relatively low and light oil is present.

Extending from the low pressure supply line 63 is a branch pipe 256 (FIGURE 1B) which leads to the inlet orifice 257 of a flow control valve 258. Within the valve is a needle 259 regulating the normal rate of flow therethrough to an outlet orifice 261 connected by a duct 262 to a port 263 leading into the valve 244. Also communicating with the inlet 257 is a bleed port 264, flow through which is controlled by a needle valve and lever 266 normally urged by a spring 277 into valve closed position. A thermostat 278 within the device 35 and subject to the temperature of the oil flowing is effective to permit the spring 277 to keep the needle 266 closed when the oil temperature is low; that is, when light oil is flowing. When heavy oil is flowing and the temperature is high, the thermostat 278 expands against the spring 277 and opens the needle 266 so that air bled in through the inlet port 257 under control of the valve 259 is immediately discharged past the open needle 266 and escapes through a port 279 to the atmosphere.

After a shift when the hot, heavy oil has passed out of the device 35 and the thermostat has been cooled by the incoming light oil, then the needle 266 closes. Air passing the metering needle 259 flows into the conduit 262 and is effective to translate the piston rod 249 to the left in the valve 244 against the urgency of the spring 251 and to block the discharge port 246. The air escaping at a controlled rate through the outlet 241 is then effective to build up pressure through the line 242 and through the port 221 on the upper side of the piston 222 to shift the piston and the valve cores 233 and 234. This effectuates a change in flow path so that the returning, light oil instead of going to the heavy oil tank is deflected into the light oil tank. Speaking generally, it is considered that no heavy oil should get into the light oil tank in any quantity whatsoever, but if some light oil gets into the heavy oil tank, that is not deleterious. With this arrangement, after the temperature has changed and the air flow has proceeded for a sufficient length of time, depending upon the characteristics of the system, the return oil flow is altered accordingly.

In a corresponding fashion, when the lever 177 is shifted from light oil position to heavy oil position and reversed air pressure conditions are obtained, there is an immediate shift of both the supply selector 192 and the return selector 218. While this may result in some light oil being discharged into the heavy oil tank, there is no objection to this.

Unless the temperature of the heavy oil is maintained, the system is conditioned automatically to shift over to light oil operation. The low pressure air line 63 has an opening 280 into the casing 281 of the temperature responsive mechanism 22. This mechanism is the same as the mechanism 35, the operation being in the same sense. Thus, when the heavy oil passing through the device 22 is at or above its predetermined temperature, and the thermostat holds the needle valve lever open, the pressure air entering the port 280 bleeds off to the atmosphere through a port 282.

If the heavy oil should for some reason lose its high temperature; for example, by failure of the oil heater 15, then the thermostat in the responsive device 22 closes the bleed port and air under pressure from the line 63 and the port 280 flows through an orifice 283 into a line 284. This extends to a port 286 at one end of the valve 107. The pressure increase therein is effective to translate a piston 287 to the left against the urgency of a spring 288. The piston 287 is on the stem 111 and so shifts the pistons 108 and 109 to the left. When this happens, the line 114 opening into the port 113 is immediately placed in communication with the atmosphere through a port 289. This bleeds air from the lines 126 and 141 as well and reduces the pressure within the casing of the valve 146 under the piston 148 as soon as the volume of the accumulator 143 is exhausted. Thereupon the pistons 149 and 148 shift location under the urgency of the spring 152. The port 157 is then in communication with the port 153 so that high pressure air is fed through the valve 159. Pressure air then extends through the conduit 168 into the left-hand end of the control valve 171 and is exerted against the end of the piston 173. This immediately translates the rod 172 to the right, putting the lever 177 into the light oil position and promptly shifts operation from heavy oil fuel to light oil fuel.

A somewhat related action takes place should the pressure of the heavy oil be unduly low. Opening into the casing of the temperature sensing device 22 is a pressure pipe 301 leading to an inlet port 302 communicating with the under side of a pressure diaphragm 303. The diaphragm has a stem 304 bearing against a return spring 306. A pivoted lever 307 is mounted to pass on both sides of dead center and bears against a disk 308 on the stem 304. The lever 307 cams against a disk 309 on the end of the stem 103. The parts are held in position, as shown in FIGURE 1A, by adequate heavy oil pressure to maintain the diaphragm 303 in uppermost position. The spring 306 is compressed and the lever 307 stays in slightly over center position, lock camming the stem 103 to the left in that figure.

Should the heavy oil pressure drop below a safe value, then the spring 306 overcomes the remaining pressure under the diaphragm 303 and the disk 308 displaces or rotates the lever 307 over its dead center position, releasing the disk 309. This permits the spring 104 to translate the piston 102 and the rod 103 to the right. When that occurs, the connecting duct 106 is placed in communication with the atmosphere through a port 311 in the casing of the valve 97 so that the line 106 and the line 114 as well as the line 126 and the line 141 are bled to atmospheric pressure and the system shifts, as described before, to operation on light oil.

With this mechanism, restoration of the pressure of the heavy oil does not of itself transfer the engine operation to heavy oil. Rather, a manual operation is necessary for that purpose in order that the operator can be assured that the failure of heavy oil pressure is not due to a serious difficulty. For that reason, the high pressure line 61 has a branch 312 (FIGURE 1A) leading to a manual reset casing 313 within which a piston 314 is reciprocable by manual operation of a stem 315. Normally, the piston is kept in uppermost position by a spring 317 strong enough to withstand the air pressure in the line 312. When the plunger 316 is pulled manually, the piston 314 is displaced downwardly against the spring force, thus connecting the line 312 with a junction line 318 leading to the inlet port of a servo cylinder 319. Within the servo cylinder is a piston 321 connected by a rod 322 and a walking beam 323 to a connector 324 joined to the lever 307.

After the lever 307 has been tripped due to low heavy oil pressure and the piston 321 is near the top of the casing 313, the operator momentarily withdraws the stem 316, thus submitting the upper side of the piston 321 to air pressure. This again depresses the piston and rocks the walking beam 323 clockwise as seen in FIGURE 1A. The right end of the lever 307 is lifted, thus recocking the spring 306, and displaces the piston rod 103 to the left, cutting off communication with the atmosphere and permitting restoration of air pressure in the line 106 and above. Should the heavy oil pressure not come up to standard and extend the diaphragm 303 during the time the stem 316 is manually withdrawn, the piston 314 when released will ascend under the urgency of the spring 317 and will discharge the air from above the piston 321. If the diaphragm 303 does not then overcome the urgency of the spring 306, the piston 102 will be restored to its right-hand position and will again vent the mechanism, preventing operation. Should the heavy oil pressure be restored and the diaphragm 303 be distended, then the lever 307 will remain over center in its operating position. When the operator thereafter releases the stem 316 and releases the pressure above the piston 321, the parts will nevertheless stay in their running location.

It is also desired to have the arrangement effective to operate the engine 6 on light oil whenever the engine is operated at light load. The heavy oil operation is primarily intended for heavy loads only. Whenever the lever 12 is moved to or near its extreme right-hand or low load position under the influence of the governor 14 or by reason of manual, clockwise rotation of the lever 12, then the shaft 13 rotates a cam 331 out of its heavy load position and causes displacement of the follower end of a piston rod 332 controlling a piston 333 reciprocable within a valve casing 334. Air to the casing 334 is supplied from the line 182 joined to a port 336 at one end thereof.

At normal high load operation, the port 336 is in communication with an outlet port 337 joined to a line 338 connected to a delay valve 339. This is like the valve 159, for example, and has a manually adjustable controlling screw 341 for regulating the rate of air flow therethrough toward the right. Air flowing leftward through the valve 339 travels through a pipe 342 having a branch line 343

(FIGURE 1A) leading to an accumulator 344 and extending to an inlet 346 at the end of the casing of the valve 86. Under heavy load operation, air flows through the line 182 and through the valve casing 334 and at a controlled rate through the delay valve 339 to keep the accumulator 344 charged and the pistons 88 and 89 to the left so that there can be free flow between the ports 92 and 93.

When the cam 331 shifts from its high load to its low load position, it displaces the stem 332 and the piston 333 to the left, isolating the port 336 from the outlet port 337 and placing the outlet port 337 in communication with the atmosphere through a discharge port 347. When this occurs, air on the right-hand side of the valve 86 and within the accumulator 344 flows through the line 342, through the flow control valve 339, through the port 337 and through the atmospheric port 347 at a controlled rate. When sufficient air has discharged and the pressure has sufficiently dropped, then the spring 94 in the valve 86 shifts the piston 89 to the right and bleeds the line 96 connected to the port 93 to the atmosphere through an atmospheric port 348. This then drops the air pressure in the line 96 and the succeeding lines 106, 114, 126 and 141, thus shifting the valve 146. As before, high pressure air is then admitted to the left-hand end of the master switch valve 171 and automatically shifts the engine from heavy oil operation to light oil operation.

By selecting an appropriate capacity for the accumulator 344 and by appropriately adjusting the valve 339, sufficient delay or cushion can be built into the system so that a short or momentary loss of load does not effectuate a shift to light oil, but the load loss must be for a substantial and important time to produce an effective change. The same sort of time delay is provided by the accumulator 143 and the adjustable valve 138 so that only after a predetermined time is the shift to light oil made following a signal of excessive temperature, low oil pressure or the like.

What is claimed is:

1. A dual fuel system for an engine comprising a heavy fuel oil tank, means for supplying heavy fuel oil from said heavy fuel oil tank to said engine, means for imparting a high temperature to said heavy fuel oil, a light fuel oil tank, means for supplying light fuel oil from said light fuel oil tank to said engine, means for returning fuel oil from said engine to said heavy fuel oil tank, means for returning fuel oil from said engine to said light fuel oil tank, a valve for directing fuel oil returning from said engine into either of said fuel oil returning means, and means responsive to the temperature of fuel oil returning from said engine for operating said valve.

2. A dual fuel system for an engine as in claim 1 in which said valve is positioned to direct high temperature fuel returning from said engine to said heavy fuel oil tank.

3. A dual fuel system for an engine comprising means for receiving surplus fuel oil from said engine, a pair of fuel oil tanks, means for directing said surplus fuel oil from said receiving means into either of said fuel oil tanks, and means responsive to the temperature of said surplus fuel oil in said receiving means for controlling said directing means.

4. A dual fuel system for an engine comprising a heavy fuel oil tank, means for supplying heavy fuel oil from said heavy fuel oil tank to said engine, means for returning surplus heavy fuel oil from said engine to said heavy fuel oil tank, a light fuel oil tank, means for supplying light fuel oil from said light fuel oil tank to said engine, means for returning surplus light fuel oil to said light fuel oil tank, means for quickly opening and closing said heavy fuel oil supplying means and said light fuel oil supplying means, and means for slowly opening and quickly closing said light fuel oil returning means and for slowly closing and quickly opening said heavy fuel oil returning means.

5. A dual fuel system for an engine comprising a source of light fuel oil, a source of heavy fuel oil, means including a first valve for selectively connecting said engine fuel inlet to said light fuel oil source or to said heavy fuel oil source, means including a second valve for selectively connecting said engine fuel return to said light fuel oil source or to said heavy fuel oil source, means for actuating said valves simultaneously, and means for delaying the effect of said second valve to preclude return of heavy fuel oil to said light fuel oil source.

6. A dual fuel system for an engine comprising a first source of fuel, a second source of fuel, means for supplying said engine with fuel from either of said sources, means for returning excess fuel from said engine to either of said sources, and means responsive to the temperature of said excess fuel in said returning means for controlling the particular one of said two sources to which said fuel is returned by said returning means.

References Cited by the Examiner

UNITED STATES PATENTS

| | | | |
|---|---|---|---|
| 1,617,470 | 2/1927 | Williams | 158—36.0 |
| 1,776,871 | 9/1930 | Thurber | 123—127 |
| 2,243,594 | 5/1941 | De Voe et al. | 123—127 |
| 2,768,496 | 10/1956 | Stamm et al. | 60—39.14 |
| 2,984,229 | 5/1961 | Vaughan | 123—139 |

FREDERICK L. MATTESON, JR., *Primary Examiner.*

ROBERT A. DUA, *Assistant Examiner.*